United States Patent
Imamura et al.

(10) Patent No.: US 11,186,888 B2
(45) Date of Patent: Nov. 30, 2021

(54) GRAIN-ORIENTED ELECTRICAL STEEL SHEET AND METHOD FOR PRODUCING THE SAME

(71) Applicant: JFE STEEL CORPORATION, Tokyo (JP)

(72) Inventors: Takeshi Imamura, Tokyo (JP); Masanori Takenaka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 54 days.

(21) Appl. No.: 15/742,144

(22) PCT Filed: Jul. 6, 2016

(86) PCT No.: PCT/JP2016/069976
§ 371 (c)(1),
(2) Date: Jan. 5, 2018

(87) PCT Pub. No.: WO2017/006955
PCT Pub. Date: Jan. 12, 2017

(65) Prior Publication Data
US 2018/0202018 A1  Jul. 19, 2018

(30) Foreign Application Priority Data
Jul. 8, 2015  (JP) .............................. JP2015-136742

(51) Int. Cl.
*C21D 9/46* (2006.01)
*C22C 38/14* (2006.01)
(Continued)

(52) U.S. Cl.
CPC ................. *C21D 9/46* (2013.01); *C21D 1/74* (2013.01); *C21D 3/04* (2013.01); *C21D 6/008* (2013.01);
(Continued)

(58) Field of Classification Search
CPC .......... C21D 3/04; C21D 6/008; C22C 38/004
See application file for complete search history.

(56) References Cited

U.S. PATENT DOCUMENTS 3,627,594 A  12/1971  Yamamoto et al.
3,932,234 A  1/1976  Imanaka
(Continued)

FOREIGN PATENT DOCUMENTS

| CN | 1256321 A | 6/2000 |
| CN | 1400319 A | 3/2003 |

(Continued)

OTHER PUBLICATIONS

Washko, S.D. et al,, "The effect of forsterite coatings on magnetic properties and domain structure of grain oriented 3% Si—Fe", Nov. 1982, vol. 53(11), pp. 8296-8298, Journal of Applied Physics (Year: 1982).*

(Continued)

*Primary Examiner* — Anthony J Zimmer
*Assistant Examiner* — Sean P. O'Keefe
(74) *Attorney, Agent, or Firm* — RatnerPrestia

(57) ABSTRACT

In the production of a grain-oriented electrical steel sheet by hot rolling a slab containing Si: 2.0-8.0 mass % and no inhibitor-forming ingredients, cold rolling, subjecting to a decarburization annealing, applying an annealing separator composed mainly of MgO and containing a Ti compound(s) and subjecting to a finish annealing, an atmosphere in the heating process of the decarburization annealing is rendered into a dry atmosphere having a dew point of not higher than 0° C. and a Ti amount (Ti(a)) and a N amount (N(a)) contained in an iron matrix after the removal of a forsterite coating and a Ti amount (Ti(b)) and a N amount (N(b))

(Continued)

contained in the steel sheet having a forsterite coating are made to satisfy relationships as N(b)≤0.0050 mass %, N(b)/N(a)≥4, and Ti(b)/Ti(a)≥4.

16 Claims, 1 Drawing Sheet

(51) Int. Cl.

| | |
|---|---|
| *C21D 8/12* | (2006.01) |
| *C22C 38/02* | (2006.01) |
| *C22C 38/04* | (2006.01) |
| *H01F 1/16* | (2006.01) |
| *C22C 38/60* | (2006.01) |
| *C21D 1/74* | (2006.01) |
| *H01F 1/147* | (2006.01) |
| *C21D 3/04* | (2006.01) |
| *C21D 6/00* | (2006.01) |
| *C22C 38/00* | (2006.01) |

(52) U.S. Cl.
CPC ......... *C21D 8/1255* (2013.01); *C21D 8/1272* (2013.01); *C21D 8/1283* (2013.01); *C22C 38/00* (2013.01); *C22C 38/001* (2013.01); *C22C 38/004* (2013.01); *C22C 38/02* (2013.01); *C22C 38/04* (2013.01); *C22C 38/14* (2013.01); *C22C 38/60* (2013.01); *H01F 1/14775* (2013.01); *H01F 1/16* (2013.01); *C21D 8/1222* (2013.01); *C21D 8/1233* (2013.01); *C21D 8/1266* (2013.01)

(56) References Cited

U.S. PATENT DOCUMENTS

| | | | |
|---|---|---|---|
| 5,318,639 | A | 6/1994 | Hayakawa et al. |
| 6,676,771 | B2 | 1/2004 | Takashima et al. |
| 9,406,437 | B2 | 8/2016 | Omura et al. |
| 2001/0030001 | A1 | 10/2001 | Hayakawa et al. |
| 2003/0116236 | A1 | 6/2003 | Hayakawa et al. |
| 2004/0074565 | A1* | 4/2004 | Hayakawa ........... C21D 8/1272 148/111 |
| 2005/0224142 | A1 | 10/2005 | Hayakawa et al. |
| 2010/0055481 | A1 | 3/2010 | Kubo et al. |
| 2015/0007908 | A1 | 1/2015 | Watanabe et al. |
| 2015/0194247 | A1 | 7/2015 | Shingaki et al. |

FOREIGN PATENT DOCUMENTS

| | | | | |
|---|---|---|---|---|
| CN | 1407119 | A | 4/2003 | |
| CN | 1458984 | A | 11/2003 | |
| CN | 101541991 | A | 9/2009 | |
| CN | 103069032 | A | 4/2013 | |
| CN | 103687967 | A | 3/2014 | |
| CN | 104160044 | A | 11/2014 | |
| EP | 0535651 | A1 | 4/1993 | |
| EP | 2746410 | A1 * | 6/2014 | ............ C22C 38/60 |
| EP | 2878687 | A1 | 6/2015 | |
| JP | S4015644 | B | 4/1963 | |
| JP | S49029409 | B | 11/1970 | |
| JP | S51012451 | B | 4/1976 | |
| JP | S51013469 | B | 4/1976 | |
| JP | 05195072 | A | 8/1993 | |
| JP | 06179977 | A | 6/1994 | |
| JP | 2000119824 | A | 4/2000 | |
| JP | 2000129356 | A | 5/2000 | |
| JP | 2003193131 | A | 7/2003 | |
| JP | 2003193131 | A * | 7/2003 | |
| JP | 2007169755 | A | 7/2007 | |
| JP | 2008261033 | A | 10/2008 | |

OTHER PUBLICATIONS

JP-2003193131-A English language translation (Year: 2003).*
Shuichi Yamazaki, "Control of High Temperature Oxidation of Si Steel under Low Oxidation Potential," Materia, vol. 37 No. 3 (1998) (Year: 1998).*
Korean Office Action for Korean Application No. 10-2018-7000550, dated Jul. 11, 2019, with Concise Statement of Relevance of Office Action, 6 pages.
Chinese Office Action for Chinese Application No. 201680039916.5, dated Dec. 5, 2018 with English Search Report, 12 pages.
International Search Report and Written Opinion for International Application No. PCT/JP2016/069976, dated Sep. 27, 2016—7 Pages.
Canadian Office Action for Canadian Application No. 2,991,294, dated Feb. 19, 2019, 4 pages.
Lu, F., et al., "Foreign Production Technology of Cold-Rolled Silicon Steel," Mar. 31, 2013, 4 pages, Metallurgical Industry Press, (English abstract only).
Chinese Office Action for Chinese Application No. 201680039916.5, dated Oct. 28, 2019, with English Search Report, 11 pages.
Japanese Office Action for Japanese Application No. 2015-136742, dated Dec. 20, 2017, including Concise Statement of Relevance of Office Action, 7 pages.
Extended European Search Report for European Application No. 16 821 424.5, dated Apr. 16, 2018, 10 pages.
Washko, S.D. et al., "The effect of forsterite coatings on magnetic properties and domain structure of grain oriented 3% Si—Fe", Nov. 1982, vol. 53(11), pp. 8296-8298, Journal of Applied Physics.
Chinese Office Action for Chinese Application No. 202010165331.6, dated May 28, 2021, with English Search Report, 11 pages.

* cited by examiner

GRAIN-ORIENTED ELECTRICAL STEEL SHEET AND METHOD FOR PRODUCING THE SAME

CROSS REFERENCE TO RELATED APPLICATIONS

This is the U.S. National Phase application of PCT/JP2016/069976, filed Jul. 6, 2016, which claims priority to Japanese Patent Application No. 2015-136742, filed Jul. 8, 2015, the disclosures of these applications being incorporated herein by reference in their entireties for all purposes.

TECHNICAL FIELD OF THE INVENTION

This invention relates to a grain-oriented electrical steel sheet suitable for use in a wound iron core for a transformer and a method for producing the same.

BACKGROUND OF THE INVENTION

A grain-oriented electrical steel sheet is an iron steel material used as an iron core material for transformers and generators. The steel sheet is cut off at an oblique angle and the cut sheets are laminated for use in large-scale transformers, while the steel sheet is frequently used in a coiled form in small-scale transformers. When the grain-oriented electrical sheet is subjected to a winding, processing strain is introduced into the interior of the steel sheet to deteriorate magnetic properties. Therefore, it is common to conduct a treatment for recovering the magnetic properties by performing stress-relief annealing after the winding to remove the processing strain.

The grain-oriented electrical steel sheet used for such an intended purpose is usually produced by a method wherein precipitates called "inhibitor" are finely dispersed and precipitated before secondary recrystallization and crystal grains having a Goss orientation are secondary-recrystallized in a finish annealing by an effect of the inhibitor (pinning effect). For example, Patent Document 1 discloses a method of using AlN or MnS as the inhibitor, and Patent Document 2 discloses a method of using MnS or MnSe as the inhibitor, which are industrially put into practical use. In these methods of using such an inhibitor for secondary recrystallization, it is necessary to reheat a slab up to a high temperature of not lower than 1400° C. before hot rolling for dissolution of inhibitor-forming ingredients, but these methods are extremely useful in a point that secondary recrystallized grains can be grown stably.

Patent Document 3 proposes a method of using a raw material containing no inhibitor-forming ingredients to develop secondary recrystallization having a Goss orientation. This method is a technique wherein grains having a Goss orientation are secondary-recrystallized without using the inhibitor by eliminating impurities such as inhibitor-forming ingredients as much as possible to prevent them from segregating and condensing in the grain boundary to thereby expose a dependency of grain boundary energy in a primary recrystallization texture on the grain boundary nature. Such an effect is generally called as "texture inhibition effect". Since it is not required to finely disperse and precipitate the inhibitor before the second recrystallization, the reheating of the slab at a high temperature is made redundant, so that this method has a large benefit in energy cost and facility maintenance. In this specification, the expression of containing no inhibitor-forming ingredients means that even if an inhibitor is formed, the amount thereof is a slight content of developing no function as an inhibitor.

In the grain-oriented electrical steel sheet used as a wound iron core for transformers, it is required that a coating formed on the surface of the steel sheet is excellent in the stripping resistance, or it is not stripped by the winding and is excellent in the insulating properties in addition to the excellent magnetic properties. As a method for improving these coating properties is developed a method of adding a small amount of a Ti compound(s) to an annealing separator. For example, Patent Document 4 discloses a method for improving the coating properties by adding 2-20 parts by mass of $TiO_2$ to 100 parts by mass of MgO, and Patent Document 5 discloses a method for improving the coating properties by adding 2-40 parts by mass of a Ti compound(s) to 100 parts by mass of MgO.

PRIOR ART DOCUMENTS

Patent Documents

Patent Document 1: JP-B-S40-15644
Patent Document 2: JP-B-S51-13469
Patent Document 3: JP-A-2000-129356
Patent Document 4: JP-B-S49-29409
Patent Document 5: JP-B-S51-12451

SUMMARY OF THE INVENTION

According to the inventors' study, however, it is revealed that when the method disclosed in Patent Documents 4 and 5 for improving the coating properties by adding the Ti compound(s) such as Ti oxide, Ti hydroxide or the like to MgO is applied to the production of grain-oriented electrical steel sheets using a material containing no inhibitor-forming ingredients, there is a problem that good magnetic properties cannot be obtained and especially the magnetic properties after the winding are largely deteriorated.

Aspects of the present invention are made in view of the above problems inherent to the conventional techniques, and the object thereof is to provide a grain-oriented electrical steel sheet, which is excellent not only in the coating properties but also in the iron loss properties after the stress-relief annealing, by using a material containing no inhibitor-forming ingredients and to propose an advantageous method of manufacturing the same.

The inventors have made various studies focusing on a balance between amounts of Ti and N contained in a steel sheet having a forsterite coating and amounts of Ti and N contained in an iron matrix after the removal of the forsterite coating in order to solve the above task. As a result, it has been found that a grain-oriented electrical steel sheet being excellent not only in the coating properties but also in the iron loss properties after subjected to a winding and a stress-relief annealing can be obtained by optimizing a balance between amounts of Ti and N contained in a steel sheet having a forsterite coating and amounts of Ti and N contained in the iron matrix after the removal of the forsterite coating, resulting from a Ti compound(s) added for the purpose of improving the coating properties in an annealing separator (MgO) in the production of the grain-oriented electrical steel sheet with a raw material containing no inhibitor-forming ingredients, and as a result aspects of the invention have been accomplished.

That is, according to an aspect of the present invention, a grain-oriented electrical steel sheet is characterized in that an iron matrix after the removal of a forsterite coating has a chemical composition comprising C: not more than 0.0050 mass %, Si: 2.0-8.0 mass %, Mn: 0.005-1.0 mass % and the remainder being Fe and inevitable impurities and N(b) ≤0.0050 mass %, N(b)/N(a)≥4 and Ti(b)/Ti(a)≥4 are satisfied when a Ti amount (mass %) and a N amount (mass %) contained in the iron matrix after the removal of the forsterite coating are Ti(a) and N(a) and a Ti amount (mass %) and a N amount (mass %) contained in a steel sheet having a forsterite coating are Ti(b) and N (b), respectively.

The grain-oriented electrical steel sheet according to aspects of the invention is characterized in that Ti (a) is not more than 0.0025 mass % and N(a) is not more than 0.0010 mass %.

Also, the grain-oriented electrical steel sheet according to aspects of the invention is characterized in that the iron matrix after the removal of the forsterite coating contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

Further, the grain-oriented electrical steel sheet according to aspects of the invention is characterized by being used as a wound iron core for transformers.

Aspects of the present invention also propose a method for producing a grain-oriented electrical steel sheet by subjecting a slab having a chemical composition comprising C: 0.010-0.100 mass %, Si: 2.0-8.0 mass %, Mn: 0.005-1.0 mass %, Al: not more than 0.010 mass %, N: not more than 0.005 mass %, 5: not more than 0.0050 mass %, Se: not more than 0.0050 mass % and the remainder being Fe and inevitable impurities to hot rolling, one cold rolling or two or more cold rollings interposing an intermediate annealing therebetween after or without a hot-band annealing, a decarburization annealing combined with a primary recrystallization annealing, an application of an annealing separator composed mainly of MgO and containing a Ti compound(s) and a finish annealing, characterized in that the decarburization annealing is conducted at a soaking temperature of 800-900° C. and an atmosphere in a heating process up to this temperature is a dry atmosphere having a dew point of not higher than 0° C.

The method for producing a grain-oriented electrical steel sheet according to aspects of the invention is characterized in that temperature zones for the dry atmosphere in the heating process of the decarburization annealing are a zone of not higher than 350° C. and a zone from 750° C. to the soaking temperature.

Also, the method for producing a grain-oriented electrical steel sheet according to aspects of the invention is characterized by using an annealing separator prepared by adding 0.5-10 parts by mass of a Ti compound(s), as converted to $TiO_2$, to 100 parts by mass of MgO.

Further, the method for producing a grain-oriented electrical steel sheet according to aspects of the invention is characterized in that an atmosphere of a secondary heating from a secondary recrystallization temperature to a highest achieving temperature in the finish annealing is a $N_2$-containing atmosphere of $N_2$: 10-50 vol %.

In addition, the method for producing a grain-oriented electrical steel sheet according to aspects of the invention is characterized in that the highest achieving temperature in the finish annealing falls into the range of 1170-1250° C.

The slab used in the method for producing a grain-oriented electrical steel sheet according to aspects of the invention is characterized by further containing one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

According to aspects of the invention, it is possible to stably provide a grain-oriented electrical steel sheet being excellent not only in the coating properties and magnetic properties of a product sheet but also in the iron loss properties after being subjected to a winding and a stress-relief annealing by optimizing a balance between amounts of Ti and N contained in a steel sheet having a forsterite coating and amounts of Ti and N contained in an iron matrix after the removal of the forsterite coating even when a raw material containing no inhibitor-forming ingredients is used.

DETAILED DESCRIPTION OF EMBODIMENTS OF THE INVENTION

Experiments leading to the development of aspects of the invention will be first described.

Experiment 1

A steel slab containing C: 0.032 mass %, Si: 3.22 mass %, Mn: 0.12 mass %, sol. Al: 0.0065 mass %, N: 0.0036 mass %, S: 0.0014 mass % and the remainder being Fe and inevitable impurities is produced by a continuous casting method, reheated to a temperature of 1200° C., and hot rolled to provide a hot rolled sheet having a sheet thickness of 12 mm, which is subjected to a hot-band annealing at 1000° C. for 30 seconds and thereafter cold rolled to form a cold rolled sheet having a thickness of 0.23 mm.

Next, the cold rolled sheet is subjected to a decarburization annealing in a wet atmosphere of 50 vol % $H_2$—50 vol % $N_2$ having a dew point of 60° C. at 850° C. for 100 seconds. In this regard, an atmosphere in the heating process up to 850° C. is a dry atmosphere of 100 vol % $N_2$ (dew point: −50° C.) from a room temperature to 350° C., a wet atmosphere of 50 vol % $H_2$—50 vol % $N_2$ (dew point: 60° C.) from 350° C. to 750° C., and a dry atmosphere of 100 vol % $N_2$ (dew point: −50° C.) from 750° C. to 850° C.

Thereafter, the cold rolled sheet is coated with an annealing separator composed mainly of MgO and prepared by adding $TiO_2$ varied in a range of 0-20 parts by mass to MgO: 100 parts by mass in a varying coating weight, dried, held in a $N_2$ atmosphere at 950° C. for 40 hours to complete secondary recrystallization, and then subjected to a finish annealing wherein the sheet is secondarily heated to a highest achieving temperature of 1140-1280° C. at a heating rate of 20° C./h, held in a 112 atmosphere for 10 hours, and then cooled. In this regard, an atmosphere in the secondary heating is a mixed atmosphere of $N_2$ and $H_2$, wherein the concentration of $N_2$ is varied in a range of 0-75 vol %. Also, an atmosphere in the cooling is an Ar atmosphere. Next, the sheet is subjected to a flattening annealing at 830° C. for 30 seconds for shape correction to form a product sheet (grain-oriented electrical steel sheet).

With regard to the steel sheet having a forsterite coating thus obtained, an iron loss $W_{17/50}$ (an iron loss value when excited with 1.7 T at a frequency of 50 Hz) is measured by a method described in JIS C2550, and also amounts of Ti and N are measured by a method described in JIS G1223 and JIS G1228. Further, the steel sheet having a forsterite coating is immersed in a solution containing 10 mass % of HCl at 85° C. for 3 minutes to remove the forsterite coating, and thereafter amounts of Ti and N contained in an iron matrix are measured by a method described in JIS G1223 and JIS G1228.

Figure 1:
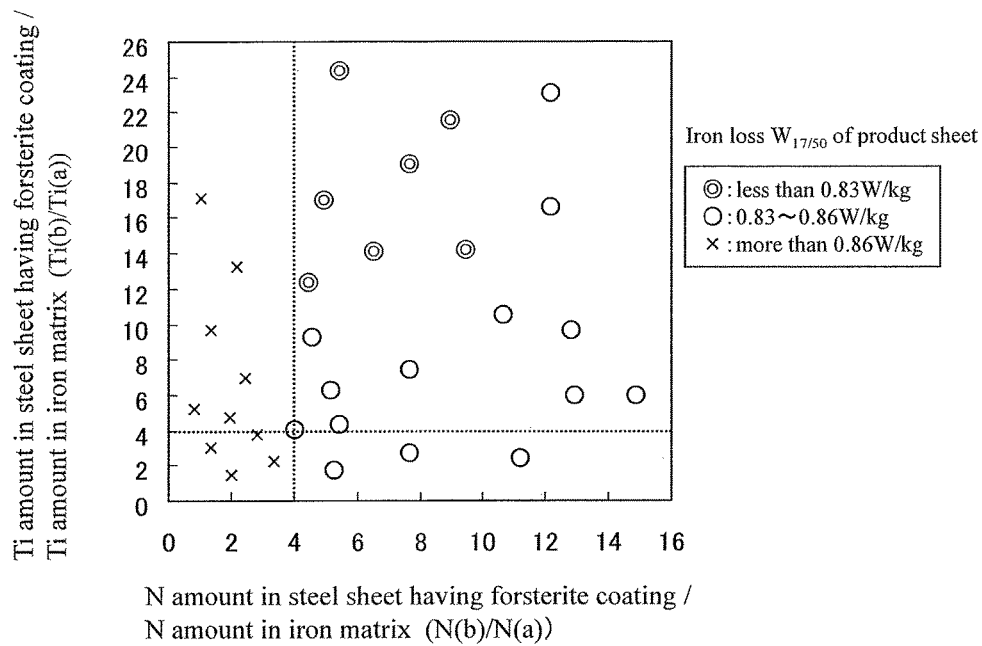
FIG. 1 is a graph showing an influence of a ratio of amounts of Ti and N contained in a steel sheet having a forsterite coating to amounts of Ti and N contained in an iron matrix after the removal of the forsterite coating upon iron loss properties.

The measured results are shown in FIG. 1 as a ratio (Ti(b)/Ti(a)) of Ti amount (Ti(b)) contained in the steel sheet having the forsterite coating to Ti amount (Ti(a)) contained in the iron matrix after the removal of the forsterite coating and a ratio (N(b)/N(a)) of N amount (N(b)) contained in the steel sheet having the forsterite coating to N amount (N(a)) contained in the iron matrix after the removal of the forsterite coating. As seen from this figure, the magnetic properties become good when (Ti(b)/Ti(a)) is not less than 4 and (N(b)/N(a)) is not less than 4, irrespectively of variations of a $TiO_2$ content in the annealing separator, a coating weight of the annealing separator, and a $N_2$ content and the highest achieving temperature in the secondary heating of the finish annealing.

Experiment 2

Next, the steel sheet having a forsterite coating after the flattening annealing obtained in Experiment 1 is subjected to bending simulating winding for an iron core according to "repetitive bending test" described in JIS C2550 in which a first bending is performed by winding the sheet around a rod having a diameter of 50 mmϕ to apply bending of 180° and returning to the original position and then a second bending is performed by applying bending of 180° in the opposite direction and returning to the original position in the same manner, whereby strain is applied to the steel sheet. Thereafter, the steel sheet is subjected to an annealing at 800° C. for 3 hours simulating a stress-relief annealing after the winding, and an iron loss $W_{17/50}$ is measured by a method described in JIS C2550 to determine a difference of the iron loss before and after the bending (deterioration quantity of iron loss).

Figure 2:
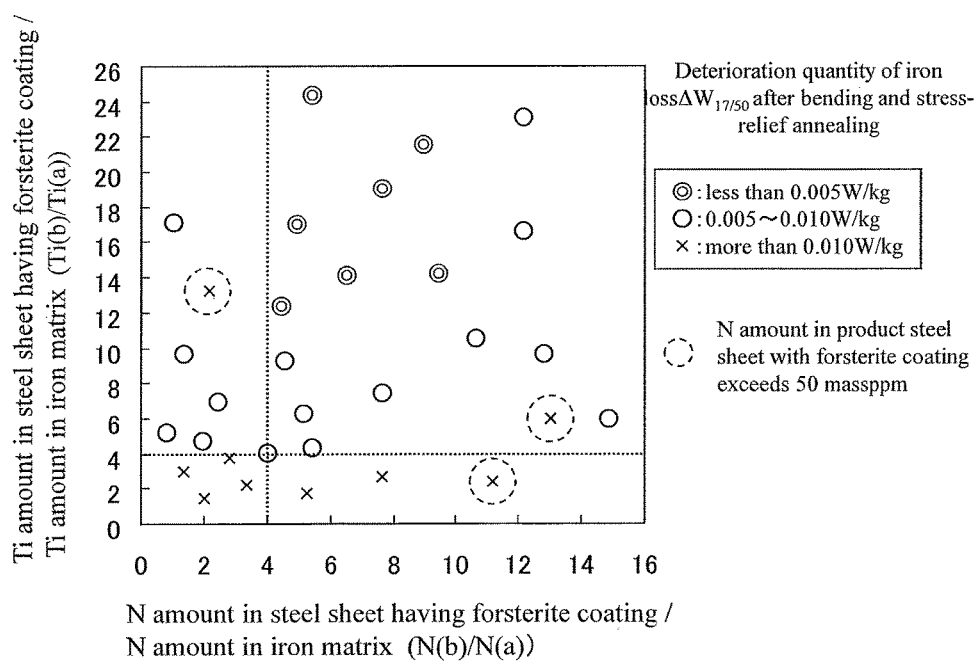
FIG. 2 is a graph showing an influence of a ratio of amounts of Ti and N contained in a steel sheet having a forsterite coating to amounts of Ti and N contained in an iron matrix after the removal of the forsterite coating upon a difference of the iron loss (deterioration quantity) before and after a stress-relief annealing.

The measured results are shown in FIG. 2 as a ratio (Ti(b)/Ti(a)) of Ti amount (Ti(b)) contained in the steel sheet having a forsterite coating to Ti amount (Ti(a)) contained in the iron matrix after the removal of the forsterite coating and a ratio (N(b)/N(a)) of N amount (N(b)) contained in the steel sheet having a forsterite coating to N amount (N(a)) contained in the iron matrix after the removal of the forsterite coating similarly in FIG. 1. As seen from this figure, the deterioration of iron loss is reduced after the stress-relief annealing when (Ti(b)/Ti(a)) is not less than 4 and (N(b)/N(a)) is not less than 4 and the N amount (N(b)) contained in the steel sheet having a forsterite coating is not more than 0.0050 mass %.

The reason why the magnetic properties are good and the deterioration of the magnetic properties after the stress-relief annealing is suppressed when the amounts of Ti and N in the steel sheet having a forsterite coating and the amounts of Ti and N in the iron matrix after the removal of the forsterite coating fall into the above ranges is not clear sufficiently, but the inventors have considered as follows.

The reason why the magnetic properties are poor after the flattening annealing and are further deteriorated after the bending and stress-relief annealing is considered due to the fact that fine precipitates containing Ti are precipitated in the interior of the iron matrix. The Ti source of the Ti-containing precipitates is a titanium compound such as titanium oxide, titanium hydroxide or the like added into the annealing separator (MgO) for the purpose of improving the coating properties. It is considered that the titanium compound is reacted with MgO in the finish annealing to assist the formation of a good coating, but Ti is separated during the reaction and penetrated in the iron matrix to form the fine precipitates.

In the case of using a raw material containing inhibitor-forming ingredients, a large amount of N, S, Se and the like forming a compound with Ti are contained in the raw material, so that these ingredients are moved toward the coating before the penetration of Ti into the iron matrix to form a Ti compound(s) in the inside of the coating, which suppresses the penetration of Ti into the iron matrix. In the case of using a raw material containing no inhibitor-forming ingredients, however, the above effect is not expected, and hence it is considered that an adverse effect on the magnetic properties is largely developed as compared to the case of using the raw material containing the inhibitor-forming ingredients.

It can be said that the addition of the Ti compound(s) to the annealing separator is not desirable in accordance with the above idea. However, the addition of the Ti compound(s) is an inevitable requirement for obtaining the good coating properties.

Therefore, the inventors have studied a method for obtaining the same effect as when using the raw material containing the inhibitor-forming ingredients by using a raw material containing no inhibitor-forming ingredients and an annealing separator added with the Ti compound(s). As a result, it has been conceived that although an ingredient fixing Ti separated from the Ti compound added in the annealing separator may be contained in the coating during the formation of the forsterite coating, since an ingredient capable of adding to the coating from exterior is only N, an atmosphere during the secondary heating of the finish annealing forming the forsterite coating (a heating process from the secondary recrystallization temperature to the highest achieving temperature) is made to be an $N_2$-containing atmosphere to thereby make N penetrate into the forsterite coating.

In order to obtain the above effect, however, it is necessary to strictly define a balance between the amounts of Ti and N in the steel sheet having the forsterite coating and the amounts of Ti and N in the iron matrix after the removal of the forsterite coating as seen from the above experimental results. It is due to the fact that when a ratio (Ti(b)/Ti(a)) of the Ti amount contained in the steel sheet having the forsterite coating to the Ti amount contained in the iron matrix and/or a ratio (N(b)/N(a)) of the N amount contained in the steel sheet having the forsterite coating to the N amount contained in the iron matrix are/is less than 4, it cannot be said that Ti is fixed sufficiently, and hence the magnetic properties are deteriorated.

As described above, the amounts of N, S, and Se in the raw material forming precipitates with Ti are small in the case of using the raw material containing no inhibitor-forming ingredients, so that it is considered that in order to fix Ti in the forsterite coating formed in the finish annealing, it is preferable that N penetrates into the forsterite coating while Ti is prevented from penetrating into steel.

As a method for preventing Ti from penetrating into steel, there is, for example, a method of making subscale into a lamella-like form by increasing a dew point of an atmosphere on the way of heating up to a soaking temperature in the decarburization annealing to enhance an oxidizability in the atmosphere and promote an initial oxidation. In this method is also suppressed the penetration of N in the finish annealing. However, since N is an ingredient necessary for suppressing grain growth before the secondary recrystallization to increase the selectivity of Goss orientation, the aforementioned effect is lost in this method.

The inventors have examined control of subscale formed in a surface layer of the steel sheet by the decarburization annealing. As a result, it has been found that the form of the subscale formed in the surface layer of the steel sheet is rendered in a mixed form of lamella and dendrite when both temperature zones, i.e. a low temperature zone of not higher than 350° C. and a high temperature zone from 750° C. to the soaking temperature in the heating process up to a soaking temperature in the decarburization annealing are rendered in a dry atmosphere, whereby a ratio of the Ti amount in the forsterite coating to the N amount penetrated into steel can be controlled to a proper range. In the production method according to aspects of the invention, therefore, it is preferable that the atmosphere in each of the low temperature zone of not higher than 350° C. and the high temperature zone from 750° C. to the soaking temperature in the heating process of the decarburization annealing is made to be a dry atmosphere. Here, the dry atmosphere means an atmosphere where a dew point is not higher than 0° C.

The grain-oriented electrical steel sheet (product sheet) according to aspects of the invention will described below.

At first, the chemical composition contained in the iron matrix after the removal of the forsterite coating is explained.

C: Not More than 0.005 Mass %

C is an element causing magnetic aging to deteriorate iron loss properties of the product sheet, so that it is limited to not more than 0.005 mass %. Preferably, it is not more than 0.003 mass %.

Si: 2.0-8.0 Mass %

Si is an element required for increasing specific resistance of steel to reduce the iron loss. When it is less than 2.0 mass %, the above effect is not sufficient, while when it exceeds 8.0 mass %, workability is deteriorated, and it is difficult to perform rolling for the production. Therefore, Si falls into the range of 2.0-8.0 mass %. Preferably, it is the range of 2.5-4.5 mass %.

Mn: 0.005-1.0 Mass %

Mn is an element required for improving hot workability of steel. When it is less than 0.005 mass %, the above effect is not sufficient, while when it exceeds 1.0 mass %, the magnetic flux density of the product sheet lowers. Therefore, Mn falls into the range of 0.005-1.0 mass %. Preferably, it is the range of 0.02-0.30 mass %.

The iron matrix for the grain-oriented electrical steel sheet according to aspects of the invention may contain one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % for the purpose of increasing the magnetic properties in addition to the above chemical composition. When each amount of these ingredients is less than the lower limit in the above range, the effect of improving the magnetic properties is poor, while when each addition amount exceeds the upper limit, it is undesirable because the saturated magnetic flux density is decreased to counteract the effect of increasing the magnetic properties.

The remainder other than C, Si, Mn, and the above ingredients selectively added is Fe and inevitable impurities. Moreover, the grain-oriented electrical steel sheet according to aspects of the invention is produced by using a raw material containing no inhibitor-forming ingredients (Al, N, S, and Se), so that Al, S, and Se other than N for nitriding into the forsterite coating in the finish annealing are in a level of inevitable impurities.

Next, an amount of Ti and an amount of N contained in a steel sheet (product sheet) having a forsterite coating will be described.

As seen from the results of the above-described experiments, it is necessary in the grain-oriented electrical steel sheet according to aspects of the invention that amounts of Ti (Ti(b)) and N (N(b)) contained in the steel sheet having a forsterite coating and amounts of Ti (Ti(a)) and N (N(a)) contained in the iron matrix after the removal of the forsterite coating fulfil the followings:

N(b): not more than 0.0050 mass %,
(Ti(b)/Ti(a))≥4, and
(N(b)/N(a))≥4.

When N(b) exceeds 0.0050 mass %, N in the forsterite coating penetrates into the iron matrix to form nitride precipitates in the stress-relief annealing of the product sheet to thereby bring about the deterioration of the magnetic properties. Further, when (Ti(b)/Ti(a)) and/or (N(b)/N(a)) are/is less than 4, Ti in the coating is not sufficiently fixed as previously mentioned, so that the magnetic properties are deteriorated. More preferable relation is as follows:

N (b): not more than 0.0030 mass %,
(Ti(b)/Ti(a))≥10, and
(N(b)/N(a)): 4-10.

Moreover, the range of Ti(b) is not particularly limited, but is desirable to be a range of 0.0080-0.0250 mass %.

The amounts of Ti and N contained in the iron matrix after the removal of the forsterite coating are desirable to be smaller for decreasing TiN precipitates and improving the iron loss properties. Concretely, they are preferable as follows:

Ti(a): not more than 0.0025 mass %
N(a): not more than 0.0010 mass %.

However, since aspects of the present invention pertain to a technique essentially requiring the addition of the Ti compound(s) to the annealing separator, the penetration of Ti into the iron matrix cannot be suppressed completely, so that it is difficult to decrease the Ti(a) amount to less than 0.0007 mass %.

Also, aspects of the present invention pertain to a technique for producing a grain-oriented electrical steel sheet by using the raw material containing no inhibitor-forming ingredients as previously described, so that S and Se contained in the raw material (slab) are moved into and fixed to the forsterite coating in the finish annealing. Since each amount of S and Se included in the raw material containing no inhibitor-forming ingredients is not more than 0.0050 mass % as described later, it is preferable that each amount of S (S(b)) and Se (Se(b)) in the steel sheet having the forsterite coating is not more than 0.0050 mass % except the case that a S compound or a Se compound is added to the annealing separator for improving the coating properties.

Next, the method for producing a grain-oriented electrical steel sheet according to aspects of the invention will be explained.

The steel raw material (slab) used for the production of the grain-oriented electrical steel sheet according to aspects of the invention is preferable to have a chemical composition wherein inhibitor-forming ingredients other than Mn as an essential ingredient are decreased as much as possible according to an aspect of the invention, or concretely contain Al: not more than 0.0100 mass %, N: not more than 0.0050 mass %, S: not more than 0.0050 mass %, and Se: not more than 0.0050 mass %. More preferably, it contains Al: not more than 0.0080 mass %, N: not more than 0.0040 mass %, S: not more than 0.0030 mass %, and Se: not more than 0.0020 mass %.

In the steel raw material (slab) used in accordance with aspects of the invention, C is preferable to fall into the range of 0.010-0.100 mass %. When C is less than 0.010 mass %, the effect of reinforcing the grain boundary by C is lost to cause cracks in the slab, which causes troubles in the production and surface defects. While, when C exceeds 0.100 mass %, it is difficult to decrease the content to not more than 0.005 mass % causing no magnetic aging in the decarburization annealing on the way of the production process. More preferably, it is a range of 0.020-0.080 mass %.

Also, the steel raw material (slab) used in accordance with aspects of the invention is preferable to have ingredients other than the above, or concretely, essential ingredients other than C (Si and Mn) and ingredients which can be selectively added (Ni, Cr, Cu, Bi, Sb, Sn, Mo, and P) in the same chemical composition as the aforementioned product sheet. Since these ingredients are not substantially varied in the production process of the usual production method, it is necessary to adjust them to the predetermined ranges in the steelmaking stage.

Moreover, the method for producing the steel raw material (slab) used in accordance with aspects of the invention is not particularly limited, and the same production method as in the raw material for the conventional grain-oriented electrical steel sheet can be used. For example, there can be used a method wherein a steel is melted by a conventionally well-known refining process of melting steel in a converter, an electric furnace or the like and secondarily refining in a vacuum degassing apparatus or the like to adjust to the above chemical composition, and then shaped into a slab by a continuous casting method or an ingot-making blooming method. Also, a thin cast slab having a thickness of not more than 100 mm may be produced by a direct casing method after the melting of steel adjusted to the chemical composition.

Then, the slab is reheated to a predetermined temperature in a heating furnace and subjected to a hot rolling. Since the slab does not contain inhibitor-forming ingredients, the temperature for reheating the slab may be made lower than a heating temperature (not lower than 1400° C.) of a slab containing inhibitor-forming ingredients, and concretely, it may be a temperature of not higher than 1300° C. Accordingly, it is more advantageous in the energy cost and surface quality than in the case of using a slab containing inhibitor-forming ingredients.

The hot rolling subsequent to the reheating of the slab may be usually conducted under a well-known condition and is not particularly limited. When the thin cast slab is produced by a direct casting method, the hot rolling may be omitted to proceed the subsequent process.

The hot rolled sheet having the predetermined thickness through the hot rolling may be subjected to a hot-band annealing, if necessary. A soaking temperature in the hot-band annealing preferably falls into the range of 800-1200° C. for obtaining good magnetic properties. When it is lower than 800° C., a band texture formed in the hot rolling remains and it is difficult to obtain the primary recrystallization texture of regulated grains, so that there is a risk of blocking the development of secondary recrystallization. On the other hand, when it exceeds 1200° C., the particle size after the hot-band annealing is too coarsened, and it is also difficult to obtain the primary recrystallization texture. More preferably, it is in the range of 900-1100° C.

Then, the steel sheet after the hot rolling or hot-band annealing is subjected to a single cold rolling or two or more cold rollings sandwiching an intermediate annealing therebetween to form a cold rolled sheet having a final thickness (product thickness). Here, a soaking temperature in the intermediate annealing is preferable to fall into the range of 900-1200° C. When it is lower than 900° C., the crystal grains are too fine and Goss nuclei in the primary recrystallization texture are decreased to lower the magnetic properties. While, when it exceeds 1200° C., the crystal grains are too coarsened like the hot-band annealing and it is difficult to obtain the primary recrystallization texture of regulated grains. It is preferably in a range of 950-1150° C.

Moreover, a final cold rolling in the cold rolling process is preferable to adopt a warm rolling wherein the rolling is performed by increasing a sheet temperature to a temperature of 100-300° C. for improving the primary recrystallization texture and increasing the magnetic properties. Also, in order to increase the magnetic properties, it is effective to conduct an aging treatment by heating the steel sheet to a temperature of 100-300° C. on the way of the cold rolling once or plural times.

Then, the cold rolled sheet having the final thickness is subjected to a decarburization annealing combined with a primary recrystallization annealing. A soaking temperature of the decarburization annealing is preferable to fall into the range of 800-900° C. from a viewpoint of ensuring sufficient decarburization properties. More preferably, it is in the range of 820-870° C. Also, an atmosphere in the decarburization annealing is preferable to be a wet atmosphere having a dew point of 45-70° C. from a viewpoint of ensuing the decarburization properties.

It is important in the production method according to aspects of the invention that an atmosphere in the heating process up to the soaking temperature during the decarburization annealing is required to be a dry atmosphere having a dew point of not higher than 0° C. for optimizing the form of the subscale as previously described. When it is the dry atmosphere, the interface form between the subscale formed in the surface layer of the steel sheet and the iron matrix becomes at a mixed state of a lamella form and a dendrite form, so that a ratio of the Ti amount in the forsterite coating to the N amount penetrated into the steel can be controlled to a proper range. The dew point is preferably not higher than −20° C. Moreover, temperature zones preferable for the dry atmosphere are both of a low temperature zone of not higher than 350° C. and a high temperature zone from 750° C. to the soaking temperature. Also, the atmosphere in an intermediate temperature zone of higher than 350° C. but lower than 750° C. is preferable to be a wet atmosphere from a viewpoint of promoting the formation of the lamella-like subscale.

The heating rate up to the decarburization temperature is preferable to be not less than 50° C./s from a viewpoint of increasing the Goss nuclei. More preferably, it is not less than 100° C./s. When the heating rate is too large, however, the principal orientation such as {111}<112> orientation or the like in the primary recrystallization texture is decreased to deteriorate the magnetic properties, so that the upper limit is preferable to be about 400° C./s.

Next, the steel sheet after the decarburization annealing is coated on the steel sheet surface with an annealing separator composed mainly of MgO, dried, and subjected to a finish annealing, whereby the secondary recrystallization texture is developed and a forsterite coating is formed.

Here, the annealing separator composed mainly of MgO is necessary to contain a Ti compound(s) such as Ti oxide, Ti hydroxide or the like for improving the coating properties. As the Ti compound may be mentioned TiO, $TiO_2$, $Ti(OH)_4$, $TiO(OH)_2$ and so on.

The addition amount of the Ti compound(s) is preferable to be 0.5-10 parts by mass to 100 parts by mass of MgO as converted to $TiO_2$. When it is less than 0.5 parts by mass, the effect of improving the coating properties by $TiO_2$ is not sufficient, while when it exceeds 10 parts by mass, Ti penetrated into steel is increased and there is a risk of deteriorating the magnetic properties. Moreover, the lower limit is more preferably 1 part by mass and further preferably 2 parts by mass. The upper limit is more preferably 7 parts by mass and further preferably 5 parts by mass.

It is preferable to perform the finish annealing by heating to not lower than 800° C. for developing the secondary recrystallization and by holding at a temperature of not lower than 800° C. for not less than 20 hours for completing the secondary recrystallization. Moreover, in order to form a forsterite coating having excellent properties and refine the iron matrix to obtain excellent magnetic properties, it is preferable to conduct a secondary heating up to a highest achieving temperature of about 1200° C., concretely within a range of 1170-1250° C. after the completion of the secondary recrystallization. More preferably, it is in the range of 1190-1230° C.

Also, an average heating rate of the secondary heating from a temperature completing the secondary recrystallization to the highest achieving temperature is preferable to fall into the range of 5-50° C./h. When it is less than 5° C./h, secondary recrystallization is caused even in orientations other than the Goss orientation, whereby the magnetic properties are deteriorated. While, when it exceeds 50° C./h, there is a risk of decreasing the time for the formation of the coating to form a poor coating. More preferably, it is in the range of 10-30° C./h.

Further, an atmosphere in the heating (secondary heating) from the temperature causing the secondary recrystallization to the highest achieving temperature is preferable to be a $N_2$-containing gas containing 10-50 vol % of $N_2$. When the $N_2$ content is less than 10 vol %, the amount of N penetrated into the forsterite coating is small, so that there is a risk that Ti in the coating cannot be sufficiently fixed. While, when it exceeds 50 vol %, the N amount is too increased in the forsterite coating, so that when the product sheet is subjected to a stress-relief annealing, N is penetrated into the iron matrix to deteriorate the magnetic properties. Moreover, it is preferable that a gas other than $N_2$ may be $H_2$ or Ar. More preferably, it falls into the range of 15-35 vol %.

Thereafter, the steel sheet after the finish annealing is washed with water, brushed or pickled to remove an unreacted annealing separator attached to the steel sheet surface and subjected to a flattening annealing for correcting the shape to obtain a product sheet. In the flattening annealing, it is preferable that a soaking temperature falls into the range of 750-950° C. and a soaking time falls into the range of 5-60 seconds. When the soaking temperature is lower than 750° C. or the soaking time is less than 5 seconds, the effect of correcting the shape cannot be sufficiently obtained, while when the soaking temperature exceeds 950° C. or the soaking time exceeds 60 seconds, there is a risk that creep deformation is caused in the steel sheet to deteriorate the magnetic properties. More preferably, the soaking temperature falls into the range of 800-900° C. and the soaking time falls into the range of 10-45 seconds.

Moreover, the grain-oriented electrical steel sheet having the forsterite coating thus obtained is preferably coated on the steel sheet surface with an insulation coating in the flattening annealing or in a step before or after the flattening annealing. In order to more improve the iron loss properties, the insulation coating is preferable to be a tension-imparting type. In the formation of the tension-imparting type insulation coating, when the coating is formed through a binder or an inorganic material is deposited on the surface layer of the steel sheet by a physical vapor deposition or a chemical vapor deposition before the formation of the coating, the adhesion property of the coating can be further improved to obtain a remarkable effect of decreasing the iron loss.

It is effective to perform a magnetic domain subdividing treatment for attaining further decrease of the iron loss. As the method for the magnetic domain subdividing treatment can be used a commonly performed method such as a method of forming grooves in a steel sheet surface of a cold rolled sheet with a final thickness or a final product sheet, a method of applying a processing strain onto a surface of a final product sheet with a roller or the like, a method of irradiating a laser beam or an electron beam to introduce a heat strain or an impact strain linearly, and so on.

Example 1

A steel slab having a chemical composition comprising C: 0.055 mass %, Si: 3.50 mass %, Mn: 0.07 mass %, sol. Al: 0.0040 mass %, N: 0.0022 mass %, S: 0.0022 mass %, and the remainder being Fe and inevitable impurities is produced by a continuous casting method, reheated to a temperature of 1200° C. and hot rolled to obtain a hot rolled sheet of 2.5 mm in thickness. The hot rolled sheet is subjected to a hot-band annealing at 1020° C. for 30 seconds, cold rolled to a thickness of 1.8 mm, subjected to an intermediate annealing at 1050° C. for 100 seconds and further cold rolled to obtain a cold rolled sheet having a final thickness of 0.23 mm.

Next, the cold rolled sheet is subjected to a decarburization annealing in a wet atmosphere of 52 vol % $H_2$—48 vol % $N_2$ having a dew point of 60° C. at 850° C. for 100 seconds. In this regard, an atmosphere in the heating from a room temperature up to 850° C. is a dry atmosphere of 100% $N_2$ (dew point: −45° C.).

Thereafter, the surface of the steel sheet subjected to the decarburization annealing is coated with an annealing separator prepared by adding $TiO_2$ in parts by mass shown in Table 1 to MgO: 100 parts by mass in a coating weight also shown in Table 1, held in a $N_2$ atmosphere at 875° C. for 50 hours to cause secondary recrystallization, and then subjected to a finish annealing by secondarily heating to a highest achieving temperature of 1200° C. at a heating rate of 10° C./h, holding this temperature in a $H_2$ atmosphere for 5 hours and then cooling. Moreover, an atmosphere in the secondary heating is a mixed atmosphere of $N_2$ and $H_2$, wherein the $N_2$ concentration is varied as shown in Table 1. Also, an atmosphere in the cooling is an Ar atmosphere. Next, the steel sheet after the finish annealing is subjected to a flattening annealing at 830° C. for 30 seconds for correcting its shape to form a grain-oriented electrical steel sheet having a forsterite coating (product sheet).

TABLE 1

| Steel No. | Annealing separator Addition amount of TiO$_2$ (parts by mass) | Annealing separator Coating weight (g/m$^2$) | N$_2$ concentration in secondary heating of finish annealing (vol %) | Chemical composition of product sheet (mass %) Iron matrix C | Si | Mn | Ti(a) | N(a) | With coating Ti(b) | N(b) |
|---|---|---|---|---|---|---|---|---|---|---|
| 1 | 2 | 5 | 5 | 0.0015 | 3.50 | 0.07 | 0.0021 | 0.0004 | 0.0050 | 0.0014 |
| 2 | 2 | 5 | 30 | 0.0013 | 3.51 | 0.07 | 0.0007 | 0.0005 | 0.0080 | 0.0027 |
| 3 | 2 | 5 | 60 | 0.0018 | 3.50 | 0.07 | 0.0008 | 0.0006 | 0.0060 | 0.0049 |
| 4 | 2 | 10 | 5 | 0.0016 | 3.52 | 0.08 | 0.0023 | 0.0005 | 0.0060 | 0.0016 |
| 5 | 2 | 10 | 30 | 0.0015 | 3.50 | 0.07 | 0.0010 | 0.0006 | 0.0070 | 0.0030 |
| 6 | 2 | 10 | 60 | 0.0015 | 3.50 | 0.07 | 0.0008 | 0.0010 | 0.0080 | 0.0044 |
| 7 | 2 | 15 | 5 | 0.0014 | 3.51 | 0.07 | 0.0024 | 0.0005 | 0.0070 | 0.0020 |
| 8 | 2 | 15 | 30 | 0.0013 | 3.49 | 0.07 | 0.0018 | 0.0005 | 0.0090 | 0.0031 |
| 9 | 2 | 15 | 60 | 0.0016 | 3.50 | 0.08 | 0.0010 | 0.0007 | 0.0070 | 0.0045 |
| 10 | 7 | 5 | 5 | 0.0018 | 3.50 | 0.07 | 0.0024 | 0.0006 | 0.0110 | 0.0018 |
| 11 | 7 | 5 | 30 | 0.0018 | 3.50 | 0.06 | 0.0020 | 0.0008 | 0.0110 | 0.0029 |
| 12 | 7 | 5 | 60 | 0.0017 | 3.48 | 0.07 | 0.0014 | 0.0010 | 0.0100 | 0.0055 |
| 13 | 7 | 10 | 5 | 0.0012 | 3.49 | 0.07 | 0.0025 | 0.0005 | 0.0110 | 0.0020 |
| 14 | 7 | 10 | 30 | 0.0017 | 3.50 | 0.07 | 0.0024 | 0.0007 | 0.0120 | 0.0037 |
| 15 | 7 | 10 | 60 | 0.0018 | 3.51 | 0.07 | 0.0018 | 0.0014 | 0.0130 | 0.0060 |
| 16 | 7 | 15 | 5 | 0.0015 | 3.52 | 0.08 | 0.0032 | 0.0012 | 0.0150 | 0.0020 |
| 17 | 7 | 15 | 30 | 0.0011 | 3.50 | 0.08 | 0.0028 | 0.0014 | 0.0150 | 0.0030 |
| 18 | 7 | 15 | 60 | 0.0016 | 3.51 | 0.07 | 0.0017 | 0.0018 | 0.0120 | 0.0068 |
| 19 | 15 | 5 | 5 | 0.0016 | 3.51 | 0.07 | 0.0031 | 0.0005 | 0.0110 | 0.0021 |
| 20 | 15 | 5 | 30 | 0.0017 | 3.48 | 0.07 | 0.0024 | 0.0005 | 0.0120 | 0.0029 |
| 21 | 15 | 5 | 60 | 0.0012 | 3.52 | 0.08 | 0.0016 | 0.0018 | 0.0130 | 0.0042 |
| 22 | 15 | 10 | 5 | 0.0015 | 3.49 | 0.06 | 0.0033 | 0.0006 | 0.0150 | 0.0015 |
| 23 | 15 | 10 | 30 | 0.0013 | 3.50 | 0.06 | 0:0030 | 0.0012 | 0.0170 | 0.0030 |
| 24 | 15 | 10 | 60 | 0.0017 | 3.51 | 0.07 | 0.0021 | 0.0019 | 0.0140 | 0.0060 |
| 25 | 15 | 15 | 5 | 0.0014 | 3.53 | 0.06 | 0.0036 | 0.0017 | 0.0200 | 0.0019 |
| 26 | 15 | 15 | 30 | 0.0017 | 3.50 | 0.07 | 0.0030 | 0.0024 | 0.0180 | 0.0033 |
| 27 | 15 | 15 | 60 | 0.0014 | 3.51 | 0.08 | 0.0023 | 0.0041 | 0.0180 | 0.0056 |

| Steel No. | Chemical composition of product sheet (mass %) Composition ratio Ti(b)/Ti(a) | N(b)/N(a) | Iron loss $W_{17/50}$ (W/kg) Product sheet (c) | After stress-relief annealing (d) | Difference (d − c) | Remarks |
|---|---|---|---|---|---|---|
| 1 | 2.4 | 3.5 | 0.888 | 0.914 | 0.026 | Comparative Example |
| 2 | 11.4 | 5.4 | 0.825 | 0.825 | 0 | Inventive Example |
| 3 | 7.5 | 8.2 | 0.841 | 0.846 | 0.005 | Inventive Example |
| 4 | 2.6 | 3.2 | 0.891 | 0.905 | 0.014 | Comparative Example |
| 5 | 7.0 | 5.0 | 0.834 | 0.839 | 0.005 | Inventive Example |
| 6 | 10.0 | 4.4 | 0.833 | 0.834 | 0.001 | Inventive Example |
| 7 | 2.9 | 4.0 | 0.849 | 0.877 | 0.028 | Comparative Example |
| 8 | 5.0 | 6.2 | 0.844 | 0.849 | 0.005 | Inventive Example |
| 9 | 7.0 | 6.4 | 0.853 | 0.859 | 0.006 | Inventive Example |
| 10 | 4.6 | 3.0 | 0.885 | 0.892 | 0.007 | Comparative Example |
| 11 | 5.5 | 3.6 | 0.871 | 0.878 | 0.007 | Comparative Example |
| 12 | 7.1 | 5.5 | 0.923 | 0.931 | 0.008 | Comparative Example |
| 13 | 4.4 | 4.0 | 0.845 | 0.852 | 0.007 | Inventive Example |
| 14 | 5.0 | 5.3 | 0.844 | 0.850 | 0.006 | Inventive Example |
| 15 | 7.2 | 4.3 | 0.840 | 0.848 | 0.008 | Inventive Example |
| 16 | 4.7 | 1.7 | 0.904 | 0.909 | 0.005 | Comparative Example |
| 17 | 5.4 | 2.1 | 0.897 | 0.905 | 0.008 | Comparative Example |
| 18 | 7.1 | 3.8 | 0.881 | 0.888 | 0.007 | Comparative Example |
| 19 | 3.5 | 4.2 | 0.852 | 0.883 | 0.031 | Comparative Example |
| 20 | 5.0 | 5.8 | 0.839 | 0.846 | 0.007 | Inventive Example |
| 21 | 8.1 | 2.3 | 0.894 | 0.901 | 0.007 | Comparative Example |
| 22 | 4.5 | 2.5 | 0.879 | 0.885 | 0.006 | Comparative Example |
| 23 | 5.7 | 2.5 | 0.881 | 0.888 | 0.007 | Comparative Example |
| 24 | 6.7 | 3.2 | 0.872 | 0.880 | 0.008 | Comparative Example |
| 25 | 5.6 | 1.1 | 0.923 | 0.932 | 0.009 | Comparative Example |
| 26 | 6.0 | 1.4 | 0.915 | 0.922 | 0.007 | Comparative Example |
| 27 | 7.8 | 1.4 | 0.936 | 0.944 | 0.008 | Comparative Example |

A sample is taken out from the grain-oriented electrical steel sheet having the forsterite coating thus obtained to measure an iron loss $W_{17/50}$ (an iron loss when excited with 1.7 T at a frequency of 50 Hz) by a method described in JIS C2550.

The sample after the measurement of the iron loss is further subjected to a first bending by winding around a rod having a diameter of 50 mmφ to bend by 180° and returning to the original position and a second bending by bending by 180° in the opposite direction and returning to the original position according to "a repetitive bending test" described in JIS C2550 to apply a strain to the steel sheet. After the sample is subjected to a stress-relief annealing at 800° C. for 3 hours, an iron loss $W_{17/50}$ is again measured by the method described in JIS C2550 to determine an iron loss difference before and after the bending (deterioration quantity of iron loss).

Also, the amounts of Ti and N contained in the steel sheet having the forsterite coating are measured by methods described in JIS G1223 and JIS G1228, respectively. After the sample is immersed in a solution of 10% HCl at 85° C. for 3 minutes to remove the forsterite coating from its surface, the amounts of Ti, N, C, Si, and Mn contained in the iron matrix are measured by methods described in JIS G1223, JIS G1228, JIS G1211, JIS G1212, and JIS G1213, respectively.

The measured results are also shown in Table 1. As seen from this table, the magnetic properties of a product sheet are excellent and the deterioration of iron loss by the stress-relief annealing is small only in the steel sheets wherein the amounts of Ti (Ti(b)) and N (N(b)) contained in the steel sheet having the forsterite coating and the amounts of Ti (Ti(a)) and N (N(a)) contained in the iron matrix after the removal of the forsterite coating fall into ranges conforming to aspects of the invention, irrespectively of the production conditions.

Example 2

Various steel raw materials (slabs) having a chemical composition shown in Table 2 are produced by a continuous casting method, reheated to a temperature of 1150° C., and hot rolled to obtain a hot rolled sheet having a thickness of 2.2 mm, which is subjected to a hot-band annealing at 1100° C. for 30 seconds and cold rolled to form a cold rolled sheet having a final thickness of 0.23 mm.

Next, the cold rolled sheet is subjected to a decarburization annealing in a wet atmosphere of 60 vol % $H_2$—40 vol % $N_2$ having a dew point of 53° C. at 820° C. for 100 seconds. In this regard, an atmosphere in the heating process up to 850° C. is a dry atmosphere (dew point: −30° C.) of 100 vol % $N_2$ from a room temperature to 350° C., a wet atmosphere of 50 vol % $H_2$-50 vol % $N_2$ (dew. point: 60° C.) from 350° C. to 750° C., and a dry atmosphere of 100 vol % $N_2$ (dew point: −45° C.) from 750° C. to 850° C.

Thereafter, the surface of the steel sheet subjected to the decarburization annealing is coated with an annealing separator prepared by adding 2 parts by mass of $TiO_2$ to MgO: 100 parts by mass in a coating weight of 10 g/m², held in a $N_2$ atmosphere at 875° C. for 50 hours to cause secondary recrystallization, and then subjected to a finish annealing by secondarily heating to a highest achieving temperature of 1200° C. at a heating rate of 10° C./h, holding in a $H_2$ atmosphere at this temperature for 5 hours, and then cooling. In this regard, an atmosphere in the secondary heating is a mixed atmosphere of 30% $N_2$ and 70% $H_2$. Also, an atmosphere in the cooling is an Ar atmosphere. Next, the steel sheet after the finish annealing is subjected to a flattening annealing at 830° C. for 30 seconds for correcting its shape and further to a magnetic domain subdividing treatment by irradiating an electric beam to form a grain-oriented electrical steel sheet having a forsterite coating (product sheet).

A sample is taken out from the grain-oriented electrical steel sheet having the forsterite coating thus obtained, and an iron loss $W_{17/50}$ after the magnetic domain subdividing treatment and an iron loss $W_{17/50}$ after the stress-relief annealing are measured in the same manner as in Example 1.

Also, the amounts of Ti and N contained in the steel sheet having the forsterite coating and the amounts of Ti, N, C, Si, and Mn contained in the iron matrix are measured in the same manner as in Example 1. Further, the amounts of S and Se contained in the steel sheet having the forsterite coating are measured by methods described in JIS G1215 and JIS G1233, respectively.

The measured results are shown in Table 3. As seen from this table, the magnetic properties of a product sheet are excellent and the deterioration of iron loss by the stress-relief annealing is small in the steel sheets produced by using a raw material having a chemical composition adapted according to aspects of the invention and producing under conditions conforming to aspects of the invention wherein the amounts of Ti (Ti(b)) and N (N(b)) contained in the steel sheet having a forsterite coating and the amounts of Ti (Ti(a)) and N (N(a)) contained in the iron matrix after the removal of the forsterite coating fall into ranges conforming to aspects of the invention.

TABLE 2

| Steel No. | Chemical composition of raw material (mass %) | | | | | | | | Remarks |
|---|---|---|---|---|---|---|---|---|---|
| | C | Si | Mn | Al | N | S | Se | Others | |
| 1 | 0.041 | 3.25 | 0.11 | 0.0080 | 0.0035 | 0.0011 | — | — | Inventive Example |
| 2 | 0.046 | 1.55 | 0.10 | 0.0080 | 0.0036 | 0.0008 | — | — | Comparative Example |
| 3 | 0.046 | 3.34 | 1.37 | 0.0070 | 0.0029 | 0.0009 | — | — | Comparative Example |
| 4 | 0.045 | 3.24 | 0.10 | 0.0080 | 0.0030 | 0.0016 | 0.0030 | — | Inventive Example |
| 5 | 0.050 | 3.26 | 0.13 | 0.0090 | 0.0030 | 0.0013 | — | Cr: 0.06, Ni: 0.12, Sb: 0.09 | Inventive Example |
| 6 | 0.046 | 3.29 | 0.12 | 0.0080 | 0.0032 | 0.0011 | — | Sb: 0.03, P: 0.07, Mo: 0.02 | Inventive Example |
| 7 | 0.042 | 3.41 | 0.12 | 0.0080 | 0.0035 | 0.0015 | — | Sn: 0.06, Cu: 0.21 | Inventive Example |
| 8 | 0.042 | 3.34 | 0.15 | 0.0090 | 0.0031 | 0.0011 | — | Bi: 0.05, Sb: 0.22 | Inventive Example |
| 9 | 0.012 | 7.45 | 0.02 | 0.0035 | 0.0045 | 0.0032 | — | — | Inventive Example |
| 10 | 0.050 | 8.57 | 0.04 | 0.0040 | 0.0022 | 0.0046 | 0.0020 | — | Comparative Example |
| 11 | 0.074 | 2.88 | 0.85 | 0.0020 | 0.0044 | 0.0025 | — | Sb: 0.02, P: 0.03 | Inventive Example |
| 12 | 0.123 | 3.92 | 0.24 | 0.0060 | 0.0018 | 0.0021 | — | — | Comparative Example |
| 13 | 0.045 | 3.35 | 0.08 | 0.0060 | 0.0025 | 0.0065 | — | — | Comparative Example |

TABLE 2-continued

| Steel No. | Chemical composition of raw material (mass %) | | | | | | | | Remarks |
|---|---|---|---|---|---|---|---|---|---|
| | C | Si | Mn | Al | N | S | Se | Others | |
| 14 | 0.044 | 3.11 | 0.09 | 0.0060 | 0.0030 | 0.0020 | 0.0070 | — | Comparative Example |
| 15 | 0.055 | 4.12 | 0.15 | 0.0030 | 0.0077 | 0.0020 | — | — | Comparative Example |
| 16 | 0.021 | 3.68 | 0.05 | 0.0130 | 0.0046 | 0.0038 | — | — | Comparative Example |

(Remainder other than above ingredients is Fe and inevitable impurities.)

TABLE 3

| | Chemical composition of product sheet (mass %) | | | | | | | Composition ratio | | Iron loss $W_{17/50}$ (W/kg) | | | |
|---|---|---|---|---|---|---|---|---|---|---|---|---|---|
| Steel | Iron matrix | | | With coating | | | | Ti(b)/ | N(b)/ | Product sheet | After stress-relief annealing | Difference | |
| No. | C | Ti(a) | N(a) | Ti(b) | N(b) | S(b) | Se(b) | Ti(a) | N(a) | (c) | (d) | (d − c) | Remarks |
| 1 | 0.0024 | 0.0007 | 0.0005 | 0.0110 | 0.0035 | 0.0004 | — | 15.7 | 7.0 | 0.833 | 0.835 | 0.002 | Inventive Example |
| 2 | 0.0036 | 0.0009 | 0.0006 | 0.0090 | 0.0040 | 0.0005 | — | 10.0 | 6.7 | 2.511 | 2.511 | 0 | Comparative Example |
| 3 | 0.0024 | 0.0009 | 0.0006 | 0.0100 | 0.0031 | 0.0004 | — | 11.1 | 5.2 | 1.468 | 1.470 | 0.002 | Comparative Example |
| 4 | 0.0028 | 0.0013 | 0.0006 | 0.0090 | 0.0035 | 0.0004 | 0.0030 | 6.9 | 5.8 | 0.832 | 0.835 | 0.003 | Inventive Example |
| 5 | 0.0030 | 0.0017 | 0.0008 | 0.0090 | 0.0032 | 0.0004 | — | 5.3 | 4.0 | 0.815 | 0.816 | 0.001 | Inventive Example |
| 6 | 0.0016 | 0.0009 | 0.0005 | 0.0130 | 0.0041 | 0.0003 | — | 14.4 | 8.2 | 0.798 | 0.798 | 0 | Inventive Example |
| 7 | 0.0024 | 0.0010 | 0.0008 | 0.0100 | 0.0035 | 0.0005 | — | 10.0 | 4.4 | 0.806 | 0.808 | 0.002 | Inventive Example |
| 8 | 0.0017 | 0.0012 | 0.0007 | 0.0100 | 0.0034 | 0.0004 | — | 8.3 | 4.9 | 0.801 | 0.803 | 0.002 | Inventive Example |
| 9 | 0.0035 | 0.0015 | 0.0004 | 0.0120 | 0.0041 | 0.0004 | — | 8.0 | 10.3 | 0.839 | 0.840 | 0.001 | Inventive Example |
| 10 | 0.0021 | 0.0019 | 0.0005 | 0.0090 | 0.0036 | 0.0003 | 0.0020 | 4.7 | 7.2 | 2.898 | 2.900 | 0.002 | Comparative Example |
| 11 | 0.0013 | 0.0010 | 0.0004 | 0.0080 | 0.0028 | 0.0005 | — | 8.0 | 7.0 | 0.844 | 0.844 | 0 | Inventive Example |
| 12 | 0.0320 | 0.0014 | 0.0006 | 0.0100 | 0.0041 | 0.0005 | — | 7.1 | 6.8 | 2.468 | 2.555 | 0.087 | Comparative Example |
| 13 | 0.0023 | 0.0014 | 0.0005 | 0.0090 | 0.0035 | 0.0005 | — | 6.4 | 7.0 | 1.231 | 1.234 | 0.003 | Comparative Example |
| 14 | 0.0028 | 0.0022 | 0.0005 | 0.0130 | 0.0033 | 0.0004 | 0.0070 | 5.9 | 6.6 | 2.599 | 2.602 | 0.003 | Comparative Example |
| 15 | 0.0020 | 0.0008 | 0.0004 | 0.0100 | 0.0040 | 0.0004 | — | 12.5 | 10.0 | 1.446 | 1.447 | 0.001 | Comparative Example |
| 16 | 0.0016 | 0.0011 | 0.0005 | 0.0100 | 0.0045 | 0.0004 | — | 9.1 | 9.0 | 2.211 | 2.213 | 0.002 | Comparative Example |

The invention claimed is:

1. A grain-oriented electrical steel sheet, comprising:
an iron matrix; and
a forsterite coating over a surface of the iron matrix,
wherein the iron matrix has a chemical composition comprising C: not more than 0.0050 mass %, Si: 2.0-8.0 mass %, Mn: 0.005-1.0 mass %, and the remainder being Fe and inevitable impurities and N(b) ≤0.0050 mass %, N(b)/N(a)≥4, Ti(b):0.0060 to 0.130 mass % and Ti(b)/Ti(a)≥4 are satisfied, where Ti(a) and N(a) are amounts in mass % of Ti and N respectively contained in the iron matrix after a removal of the forsterite coating and Ti(b) and N(b) are amounts in mass % of Ti and N respectively contained in the steel sheet having the forsterite coating, and
wherein the steel sheet has an Iron loss $W_{17/50}$ of product sheet to be less than or equal to 0.86 W/Kg and an increase in iron loss $W_{17/50}$ after bending and stress-relief annealing of less than or equal to 0.010 W/Kg,
wherein the grain-oriented electrical steel sheet is obtained by
hot rolling a slab having a chemical composition comprising: C: 0.010-0.100 mass %, Si: 2.0-8.0 mass %, Mn: 0.005-1.0 mass %, Al: not more than 0.010 mass %, N: not more than 0.005 mass %, S: not more than 0.0050 mass %, Se: not more than 0.0050 mass %, and the remainder being Fe and inevitable impurities, subjecting to one cold rolling or two or more cold rollings interposing an intermediate annealing therebetween after or without a hot-band annealing and further to a decarburization annealing combined with a primary recrystallization annealing, conducting the decarburization annealing as a primary recrystallization annealing under an atmosphere in a heating process up to a soaking temperature of 800-900° C. in:

a dry atmosphere having a dew point of not higher than −20° C. in temperature zones of a low temperature zone of not higher than 350° C. and a high temperature zone from 750° C. to the soaking temperature and a wet atmosphere having a dew point of 45-70° C. in an intermediate temperature zone of higher than 350° C. but lower than 750° C., and applying an annealing separator composed mainly of MgO and containing a Ti compound(s), and subjecting to a finish annealing.

2. The grain-oriented electrical steel sheet according to claim 1, wherein Ti (a) is not more than 0.0025 mass % and N(a) is not more than 0.0010 mass %.

3. The grain-oriented electrical steel sheet according to claim 2, wherein the iron matrix after the removal of a forsterite coating contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

4. A wound iron core for transformers comprising the grain-oriented electrical steel sheet according to claim 3.

5. A wound iron core for transformers comprising the grain-oriented electrical steel sheet according to claim 2.

6. The grain-oriented electrical steel sheet according to claim 1, wherein the iron matrix after the removal of a forsterite coating contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

7. A wound iron core for transformers comprising the grain-oriented electrical steel sheet according to claim 6.

8. A wound iron core for transformers comprising the grain-oriented electrical steel sheet according to claim 1.

9. A method for producing a grain-oriented electrical steel sheet, comprising:
an iron matrix; and
a forsterite coating over a surface of the iron matrix,
wherein the iron matrix has a chemical composition comprising C: not more than 0.0050 mass %, Si: 2.0-8.0 mass %, Mn: 0.005-1.0 mass %, and the remainder being Fe and inevitable impurities and N(b) ≤0.0050 mass %, N(b)/N(a)≥4, Ti(b):0.0060 to 0.130 mass % and Ti(b)/Ti(a)≥4 are satisfied, where Ti(a) and N(a) are amounts in mass % of Ti and N respectively contained in the iron matrix after a removal of the forsterite coating and Ti(b) and N(b) are amounts in mass % of Ti and N respectively contained in the steel sheet having the forsterite coating, and
wherein the steel sheet has an Iron loss $W_{17/50}$ of product sheet to be less than or equal to 0.86 W/Kg and an increase in iron loss $W_{17/50}$ after bending and stress-relief annealing of less than or equal to 0.010 W/Kg, the method comprising:
hot rolling a slab having a chemical composition comprising C: 0.010-0.100 mass %, Si: 2.0-8.0 mass %, Mn: 0.005-1.0 mass %, Al: not more than 0.010 mass %, N: not more than 0.005 mass %, S: not more than 0.0050 mass %, Se: not more than 0.0050 mass %, and the remainder being Fe and inevitable impurities,
subjecting to one cold rolling or two or more cold rollings interposing an intermediate annealing therebetween after or without a hot-band annealing and further to a decarburization annealing combined with a primary recrystallization annealing,
conducting the decarburization annealing as a primary recrystallization annealing under an atmosphere in a heating process up to a soaking temperature of 800-900° C. in:
a dry atmosphere having a dew point of not higher than −20° C. in temperature zones of a low temperature zone of not higher than 350° C. and a high temperature zone from 750° C. to the soaking temperature and
a wet atmosphere having a dew point of 45-70° C. in an intermediate temperature zone of higher than 350° C. but lower than 750° C., and
applying an annealing separator composed mainly of MgO and containing a Ti compound(s), and subjecting to a finish annealing.

10. The method for producing a grain-oriented electrical steel sheet according to claim 9, wherein the annealing separator is used by adding 0.5-10 parts by mass of a Ti compound(s), as converted to $TiO_2$, to 100 parts by mass of MgO.

11. The method for producing a grain-oriented electrical steel sheet according to claim 10, wherein the slab further contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

12. The method for producing a grain-oriented electrical steel sheet according to claim 9, wherein an atmosphere of a secondary heating from a secondary recrystallization temperature to a highest achieving temperature in the finish annealing is a $N_2$-containing atmosphere of $N_2$: 10-50 vol %.

13. The method for producing a grain-oriented electrical steel sheet according to claim 12, wherein the slab further contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

14. The method for producing a grain-oriented electrical steel sheet according to claim 9, wherein a highest achieving temperature in the finish annealing falls into a range of 1170-1250° C.

15. The method for producing a grain-oriented electrical steel sheet according to claim 14, wherein the slab further contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

16. The method for producing a grain-oriented electrical steel sheet according claim 9, wherein the slab further contains one or more selected from Ni: 0.010-1.50 mass %, Cr: 0.01-0.50 mass %, Cu: 0.01-0.50 mass %, Bi: 0.005-0.50 mass %, Sb: 0.010-0.200 mass %, Sn: 0.010-0.200 mass %, Mo: 0.010-0.200 mass %, and P: 0.010-0.200 mass % in addition to the above chemical composition.

* * * * *